US012211097B2

(12) United States Patent
Triplett et al.

(10) Patent No.: US 12,211,097 B2
(45) Date of Patent: *Jan. 28, 2025

(54) DYNAMICALLY ACTIVATING AND DEACTIVATING ONE OR MORE ELEMENTS OF A TRADING TOOL

(71) Applicant: TRADING TECHNOLOGIES INTERNATIONAL INC., Chicago, IL (US)

(72) Inventors: Mark W. Triplett, St. Charles, IL (US); Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 886 days.

This patent is subject to a terminal disclaimer.

(21) Appl. No.: 17/212,563

(22) Filed: Mar. 25, 2021

(65) Prior Publication Data

US 2021/0209687 A1 Jul. 8, 2021

Related U.S. Application Data

(63) Continuation of application No. 16/537,043, filed on Aug. 9, 2019, now Pat. No. 10,997,657, which is a (Continued)

(51) Int. Cl.
*G06Q 40/04* (2012.01)
*G06Q 30/08* (2012.01)
*G06Q 40/00* (2023.01)

(52) U.S. Cl.
CPC ............ *G06Q 40/04* (2013.01); *G06Q 30/08* (2013.01); *G06Q 40/00* (2013.01)

(58) Field of Classification Search
USPC ........................................................ 705/37
See application file for complete search history.

(56) References Cited

U.S. PATENT DOCUMENTS 6,021,397 A 2/2000 Jones et al.
7,243,083 B2 7/2007 Burns et al.
(Continued)

FOREIGN PATENT DOCUMENTS

JP 2008508617 3/2008
JP 2010501940 A 1/2010
(Continued)

OTHER PUBLICATIONS

International Search Report and Written Opinion of International Application No. PCT/US2012/031096, dated Jun. 2, 2012 (mailed Jul. 6, 2012).
(Continued)

*Primary Examiner* — Hani M Kazimi
(74) *Attorney, Agent, or Firm* — McDonnell Boehnen Hulbert & Berghoff LLP

(57) ABSTRACT

Various embodiments relate to intelligently activating and deactivating a trading tool element of a trading tool to improve a user's confidence in the trading tool. By dynamically activating and deactivating elements on the trading screen, the trading tool effectively increases a user's confidence in placing a trading order, canceling a trade order, or both, for example, by eliminating or reducing undesirable options. Undesirable options might include those that are risky, contrary to a particular trading strategy, would result in a loss of money, and so on. Such an embodiment can improve the overall speed at which a user places or cancels a trade order by, among other things, effectively increasing the user's overall confidence in the trading tool.

14 Claims, 6 Drawing Sheets

Related U.S. Application Data continuation of application No. 15/359,440, filed on Nov. 22, 2016, now Pat. No. 10,424,017, which is a continuation of application No. 14/333,554, filed on Jul. 17, 2014, now Pat. No. 9,536,265, which is a continuation of application No. 13/088,022, filed on Apr. 15, 2011, now Pat. No. 8,930,258.

(56) References Cited

U.S. PATENT DOCUMENTS

| | | |
|---|---|---|
| 7,577,600 B1 | 8/2009 | Zagara et al. |
| 7,953,657 B2 | 5/2011 | West |
| 8,069,111 B2 | 11/2011 | West |
| 8,521,641 B2 | 8/2013 | West |
| 8,600,859 B2 | 12/2013 | Lanng |
| 8,930,258 B2 | 1/2015 | Triplett et al. |
| 9,536,265 B2 | 1/2017 | Triplett et al. |
| 10,424,017 B2 | 11/2019 | Triplett et al. |
| 2001/0042785 A1 | 11/2001 | Walker et al. |
| 2003/0004852 A1 | 1/2003 | Burns |
| 2004/0117302 A1 | 6/2004 | Weichert et al. |
| 2006/0282369 A1 | 12/2006 | White |
| 2007/0265954 A1 | 11/2007 | Mather et al. |
| 2007/0266329 A1 | 11/2007 | Gaudette |
| 2009/0307127 A1 | 12/2009 | Burns et al. |
| 2010/0037175 A1 | 2/2010 | West |
| 2010/0058185 A1 | 3/2010 | Commarford et al. |
| 2010/0174665 A1 | 7/2010 | Lanng |
| 2010/0312718 A1 | 12/2010 | Rosenthal et al. |
| 2012/0265664 A1 | 10/2012 | Triplett et al. |
| 2014/0330698 A1 | 11/2014 | Triplett et al. |
| 2017/0083975 A1 | 3/2017 | Triplett et al. |
| 2019/0362426 A1 | 11/2019 | Triplett et al. |

FOREIGN PATENT DOCUMENTS

| | | |
|---|---|---|
| WO | 2006015336 A2 | 2/2006 |
| WO | 2008024740 A2 | 2/2008 |

OTHER PUBLICATIONS

System for Buying and Selling Futures and Options Transaction Terminal Operational Guidelines, Tokyo Stock Exchange, 1999.

DYNAMICALLY ACTIVATING AND DEACTIVATING ONE OR MORE ELEMENTS OF A TRADING TOOL

CROSS REFERENCE TO RELATED APPLICATIONS

This application is a continuation of U.S. patent application Ser. No. 16/537,043, filed Aug. 9, 2019, now U.S. Pat. No. 10,997,657, which is a continuation of U.S. patent application Ser. No. 15/359,440, filed Nov. 22, 2016, now U.S. Pat. No. 10,424,017, which is a continuation of U.S. patent application Ser. No. 14/333,554, filed Jul. 17, 2014, now U.S. Pat. No. 9,536,265, which is a continuation of U.S. patent application Ser. No. 13/088,022, filed Apr. 15, 2011, now U.S. Pat. No. 8,930,258, entitled "Dynamically Activating and Deactivating One or More Elements of a Trading Tool," the contents of each of which are fully incorporated herein by reference for all purposes.

BACKGROUND

The present patent document relates to an electronic trading system.

An electronic trading system generally includes client devices in communication with one or more electronic exchanges. An electronic exchange receives trade orders from the client devices. Upon receiving a trade order, the electronic exchange enters the trade order into an exchange order book and attempts to match quantity of the trade order with quantity of one or more contra-side orders. By way of example, a sell order is contra-side to a buy order with the same price. Similarly, a buy order is contra-side to a sell order with the same price. Unmatched quantity of a trade order is held in the exchange order book until quantity of a trade order is matched by the electronic exchange. Unmatched quantity of a trade order may also be removed from the exchange order book when a trade order is cancelled, either by the client device or the electronic exchange. Upon matching quantity of the trade order, the electronic exchange may send a confirmation to the client device that the quantity of the trade order was matched.

In addition to receiving trade orders and matching them, an electronic exchange may transmit market data in one or more data feeds to the client devices. Market data may include, for example, price data, market depth data, last traded quantity data, trade order data, order fill data, and so on. For example, the electronic exchange might send a price data feed to the client devices to provide a current inside market (e.g., a highest bid price and a lowest ask price). In another example, the electronic exchange might send a market depth data feed to the client devices to provide the quantities available to be bought or sold at various price levels. Of course, the electronic exchange might send the data to the client devices together in one feed or multiple feeds.

In some situations, a client device receives and processes market data without displaying the market data on a display device. However, in other situations, the client device displays market data on a display device. Accordingly, the client device may include software that creates a trading screen. In general, a trading screen is an interface that activates a user to participate in an electronic trading session. For example, a trading screen may activate a user to view market data, submit a trade order to the electronic exchange, obtain a market quote, monitor a position, or any combination thereof. Example trading tools that activate this kind of functionality include X_TRADER® and MD Trader®, which are offered by Trading Technologies International, Inc., located at 222 S. Riverside Plaza, Chicago, IL, 60606.

In some situations, the client device sends one or more trade orders to the electronic exchange. However, in other situations, another device, such as server side device physically located at or near the exchange system, may be responsible for sending the one or more trade orders to the electronic exchange. Either way, it is often important to send the one or more trade orders as quick as possible to the electronic exchange to get a match, obtain a better queue position (e.g., queue position is often based on the price of the trade order and the time arrival of the trade order at the exchange), or take advantage of some other opportunity.

SUMMARY

The embodiments described herein include, but are not limited to, various devices, systems, methods, and computer program products. A few, of the many, embodiments are summarized in this section.

In an example embodiment, a method for activating and deactivating one or more elements of a trading tool is provided. In some embodiments, a trading tool element (hereinafter, "element"), such as an order entry cell or button, is a tool for performing one or more trade actions, such as setting and/or sending order entry parameters. However, in other embodiments, an element is an aspect of a trading tool that is not necessarily associated with a trade action. A trading tool can be made up of one or more elements. As used herein, activating an element relates to changing the operation state of the element from inactive to active. Once an element is active, it may be used to perform one or more trade actions. Deactivating an element relates to changing the operation state of the element from active to inactive. Once an element is inactive, it cannot be used to perform a trade action.

The method may include displaying the trading tool, which includes one or more elements, on a trading screen. Prior to, after, or at the same time the trading tool is displayed, the trading device receives market data from an exchange system. The market data may be displayed on the trading tool. Furthermore, various combinations of the elements may be activated, such that a trader may begin using the trading tool for trading purposes.

In response to changing circumstances (e.g., changing market data, placing or canceling an order, etc.), the trading device may determine which elements should be active and which should be inactive. Whether or not one or more elements should be activated or deactivated is determined based on risk management, a trading strategy, a trading methodology, a trading rule, a characteristic of a trader, movement prediction of a cursor or pointer, reduction of error (human or machine based), or any combination thereof, for example. The trading device may then dynamically activate or deactivate the corresponding elements. Furthermore, the trading device changes the display of the elements to indicate that they are active or inactive. However, in the event that the element is deactivated, the trading screen is displayed such that a user can still view the information being represented by the inactive element.

In another example embodiment, a trading tool or an element of a tool is intelligently deactivated (or activated) to narrow down the selectable options for which a new trade order is based on or a working trade order is canceled. The trading tool or element thereof is intelligently deactivated by determining that the previously selectable option should no longer be made available to the user based on one or more conditions. The deactivated tool or aspect thereof is preferably displayed to the user and can be dynamically activated when it is determined that the selectable option should be made available to the user. As such, elements of the trading tool may be deactivated and activated in real time and on the trading screen (e.g., right in front of the user), and in some cases, such deactivation/activation may occur without the system receiving any input from the user. Such an embodiment can improve the overall speed at which a user places or cancels a trade order by, among other things, effectively narrowing down options.

In yet another example embodiment, a trading tool or element of a tool is intelligently deactivated or activated to improve a user's confidence in the trading tool. By dynamically activating and deactivating elements on the trading screen, the trading tool effectively increases a user's confidence in placing a trading order, canceling a trade order, or both, for example, by eliminating or reducing undesirable options. Undesirable options might include those that are risky, contrary to a particular trading strategy, would result in a loss of money, and so on. Such an embodiment can improve the overall speed at which a user places or cancels a trade order by, among other things, effectively increasing the user's overall confidence in the trading tool.

BRIEF DESCRIPTION OF THE FIGURES

The drawings illustrate example embodiments. As such, the various embodiments should not be limited to the arrangements and instrumentality shown in the drawings. The following provides a brief description of the drawings.

DETAILED DESCRIPTION

Figure 1:
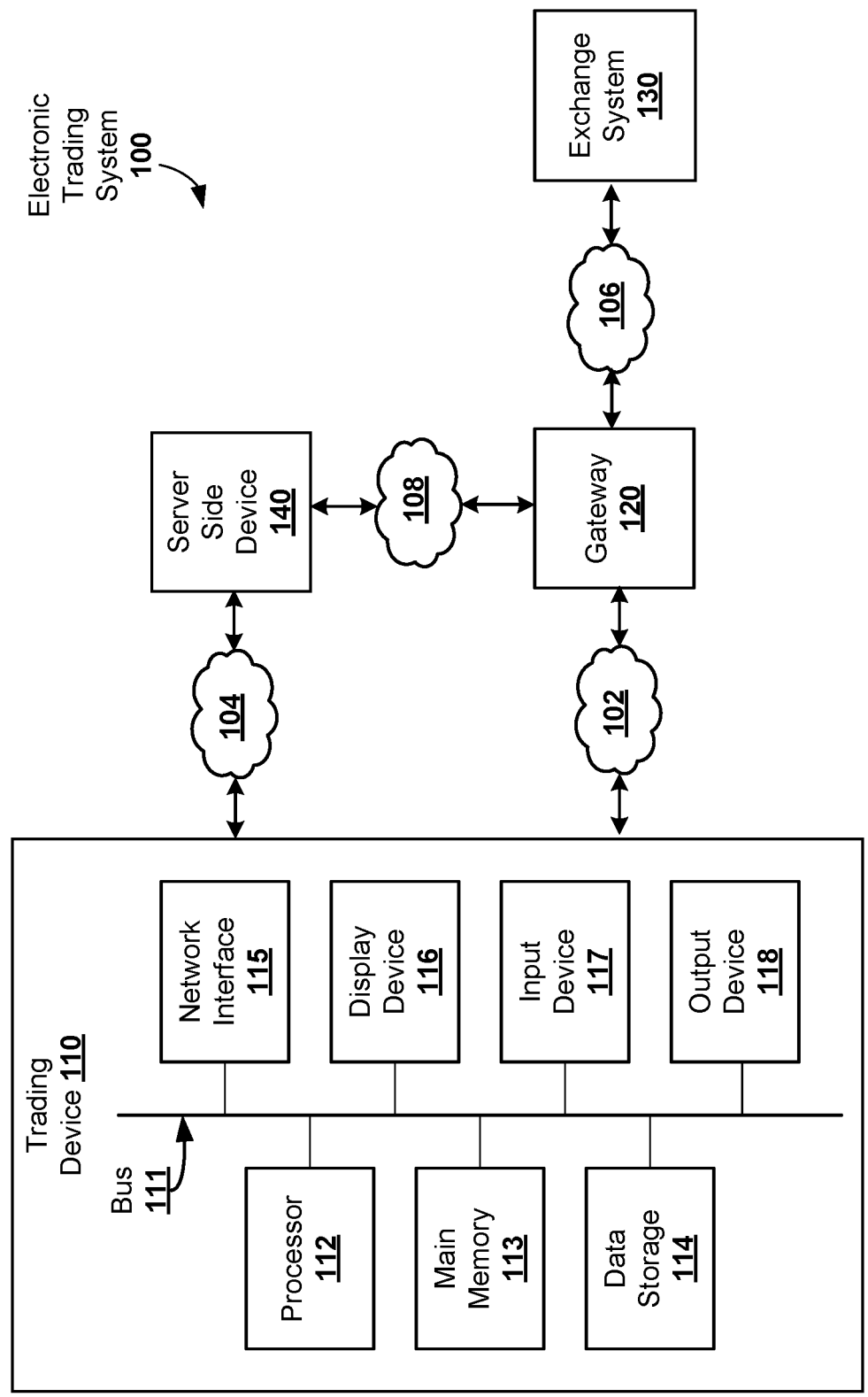
FIG. 1 illustrates an example of an electronic trading system that may be used during electronic trading.

Various embodiments disclosed herein relate to dynamically activating and deactivating one or more elements of a trading tool. As mentioned above, an element, such as an order entry cell or button, is a tool for performing one or more trade actions, such as setting and/or sending order entry parameters. However, in some embodiments, an element is merely an aspect of a trading tool that is not necessarily associated with a trade action. A trading tool, such as a trading ladder, market grid window, or chart, can be made up of one or more elements. Additionally, as used herein, an element may also be a trading tool.

Activating one or more elements includes making one or more of the elements active. That is, for example, the operation state of an element may be changed to active. Once an element is active, it is operable to perform the specified trade action(s). Whereas, deactivating one or more elements includes making one or more elements inactive. That is, for example, the operation state of an element may be changed to inactive. Once an element is inactive, it is not operable to perform the specified trade action(s).

Dynamically activating and deactivating one or more elements relates to switching the operation state of the elements from active to inactive and vice-versa, for example, as circumstances changes. This switching may be based on, for example, risk management, a trading strategy, a trading methodology, a trading rule, a characteristic of a trader, movement prediction of a cursor or pointer, reduction of error (human or machine based), or any combination thereof. Accordingly, when determining whether one or more elements of a trading tool should be deactivated or activated, a trading device may utilize, for example, market data, one or more user inputs, a trader's characteristic, the a trader's current position, historical data, risk management parameters set by a trader or a trader's firm or other intermediaries (e.g., brokers, FCMs) involved in order execution, or other data.

Furthermore, in some embodiments, in addition to dynamically activating and deactivating one or more elements, the trading device may change the display of the one or more elements to indicate the current state of operation. For example, the display may be changed to indicate whether the element is active or inactive. However, in some embodiments, even when the trading screen indicates that one or more elements are inactive, information being represented by the inactive element may still be viewed by the user and may be updated in real-time or near real-time. For example, in some embodiments, the trading device may gray out an element to indicate that the element is inactive but still show the value (e.g., price or quantity of bid value) being represented by the element.

By dynamically activating and deactivating elements on the trading screen, the trading tool effectively increases a user's confidence in placing a trade order, canceling a trade order, or both, for example, by eliminating or reducing undesirable options. Undesirable options might include those that are risky, contrary to a particular trading strategy, would result in a loss of money, and so on. Such an embodiment can improve the overall speed at which a user places or cancels a trade order by, among other things, effectively increasing the user's overall confidence in the trading tool.

The detailed description is presented largely in terms of procedures, steps, logic blocks, processing, or other symbolic representations that directly or indirectly resemble the operations of devices or systems. These descriptions and representations are typically used by those skilled in the art to most effectively convey the substance of their work to others skilled in the art. It is also worth noting that the various embodiments disclosed herein are not limited in their application to the details of design and arrangement of the components set forth in the previous and following description or as illustrated in the drawings. Instead, the previous description, following description, and the drawings focus on presenting concepts of various embodiments that may stand alone or be combined with each other. Further, the order of blocks in process flowcharts or diagrams representing one or more embodiments of the invention do not inherently indicate any particular order nor imply any limitations in the invention.

Reference herein to "one embodiment," "an embodiment," or "an example embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

I. EXAMPLE ELECTRONIC TRADING SYSTEM

FIG. 1 is a block diagram illustrating an electronic trading system ("trading system") 100. The trading system 100 includes a trading device 110, a gateway 120, and an electronic exchange system ("exchange system") 130. The trading system 100 may include additional, different, or fewer components. For example, as shown in FIG. 1 and discussed in more detail below, the trading system 100 may include a server side device 140 in communication with the trading device 110 and gateway 120. In another example, the trading system 100 may include multiple (for example, two or more) trading devices 110, multiple gateways 120, multiple exchange systems 130, multiple server side devices 140, or any combination thereof.

The trading device 110 is in communication with the gateway 120 via communication network 102. The trading device 110 is in communication with the server side device 140 via communication network 104. The gateway 120 is in communication with the exchange system 130 via communication network 106 and the server side device 140 via communication network 108. Communication between the various components of the trading system 100 may include direct communication and indirect communication through one or more intermediary components. It is noted that the server side device 140 could be in communication with the exchange via a communication network that connects to another, different, gateway than the gateway 120 in use by the client side device, for example.

A communication network, such as communication network 102, 104, 106, or 108, can include hardware (for example, servers, routers, gateways, and switches), software (for example, a trading application or a communication application), transmission channels (e.g., T1 lines, T3 lines, Integrated Services Digital Network (ISDN) lines), telecommunication networks (e.g., data network, computer network, the Internet network, wide area network, local area network), or any combination thereof. Furthermore, a communication network may include wired, wireless, or both wired and wireless networks. The same or different communication networks may be used throughout the trading system 100. For example, communication network 102 may be the same as communication network 104.

The trading device 110 is a client device, personal computer, a workstation, a desktop, a laptop, a mobile device, a handheld device, a server, a gateway, or other computing device or system. For example, the trading device 110 may be a personal computer running a copy of X_TRADER®, which is an electronic trading platform provided by Trading Technologies International, Inc. of Chicago, Illinois. As another example, the trading device 110 is a server running an automated trading tool, such as Autotrader™ or Autospreader®, which are also provided by Trading Technologies International, Inc. In yet another example, the trading device 110 is a collection of devices, such as a personal computer and a server, working in combination with each other.

The trading device 110 is generally owned, operated, controlled, programmed by, configured by, or otherwise used by a user. As used herein, the phrase "user" may include, but is not limited to, a human (e.g., a trader) or an electronic trading device (e.g., including a processor and memory or an algorithmic trading system). One or more users may be involved in the ownership, operation, control, programming, configuration or other use.

The trading device 110 may be used to electronically trade one or more tradeable objects. A tradeable object is an item that may be traded with quantities and/or prices. Stocks, options, bonds, futures, currency, warrants, derivatives, traded events, goods, securities, and commodities are a few examples of tradeable objects. Tradeable objects may be "real" or "synthetic." Real tradeable objects are products that are listed by an exchange. Synthetic tradeable objects are products that are defined by a user and are not listed by an exchange. For example, a synthetic tradeable object may include a combination of real (or other synthetic) products such as a synthetic spread created by a user utilizing the trading device 110.

Electronically trading one or more tradeable objects may include setting one or more order entry parameters, sending one or more order entry parameters, or both setting and sending one or more order entry parameters. In general, a parameter is a variable that is given a specific value during the execution of a program or of a procedure within a program. A parameter is data that defines a value, such as a price or quantity value. More specifically, an order entry parameter may be part of, associated with, or used to define a trade order. A trade order may be a message having an instruction or command to buy or sell one or more tradeable objects. When sent to the exchange system, either by the trading device or another device, the trade order may include the information necessary for the exchange system to receive the trade order and place an order in the exchange order book.

As will be explained in more detail below, an order entry parameter may be, for example, a parameter defining a tradeable object to be bought or sold (hereinafter, a "tradeable object parameter"), a parameter defining a price for the tradeable object(s) (hereinafter, a "price parameter"), a parameter defining a quantity of a tradeable object to be traded (hereinafter, a "quantity parameter"), a parameter defining an order type (hereinafter, a "order type parameter"), or any combination thereof. However, other parameters can be order entry parameters.

A tradeable object parameter, for example, defines one or more tradeable objects to be bought or sold. In some embodiments, the tradeable object parameter defines, for example, a trading strategy. A trading strategy may define a relationship between one or more tradeable objects to be traded. An exemplary trading strategy is a spread between two or more different tradeable objects, such as a butterfly spread or a calendar spread. Tradeable objects in a spread are typically different than each other. That is, the tradeable objects generally have different underlying products (e.g., corn or soybeans), different expiration dates (e.g., July and September), both different underlying products and expiration dates, or other differences. For example, a first leg may be associated with a contract for July 2010 corn (ZCNO) and a second leg display may be associated with a contract for September 2010 corn (ZCUO). In this example, these tradeable objects are different tradeable objects, even though the underlying product (e.g., corn) is the same in each contract.

A price parameter, for example, defines a price or value (e.g., a derivative of price) for the tradeable object(s) or trading strategy to be traded. A quantity parameter, for example, defines a quantity of a tradeable object to be traded. The quantity parameter may define the number of units, lots, or contracts to be traded.

An order type parameter, for example, defines whether the tradeable object(s) or trading strategy is to be bought or sold.

For example, the order type parameter may define whether an order is being placed for a "Bid" (e.g., buy) or an "Ask" (e.g., sell). The order type parameter may also define whether the order is a limit order, market order, or other type of order.

The trading device 110 is adapted to set, send, or both set and send additional, different, or fewer order entry parameters that are directly or indirectly related to a trade order that has been or will be placed with the exchange system 130. For example, the trading device 110 may send a first order type parameter defining "buy" and a second order type parameter defining "market order." The first and second order type parameters may be combined into a single message or multiple, different messages. For example, the trading device 110 may send the first and second order type parameters to the server side device 140. The first and second order type parameters may be aggregated into a trade order and sent to the exchange system 130.

Setting an order entry parameter may include selecting, assigning, or otherwise defining a value, such as a number, letter, word, price, quantity, bit, or byte. As discussed in more detail below, in various embodiments, setting one or more order entry parameters may be triggered by one or more order entry actions. However, in certain embodiments, one or more of the order entry parameters are set as default parameters. For example, a tradeable object parameter may be set based on a default parameter. A default parameter is a parameter that is automatically selected by a computer program in the absence of a choice made by the user. The trading device 110 may automatically select a tradeable object, for example, based on a trading algorithm or market condition. However, in other situations, the tradeable object may be selected by a user, for example, based on which trading tool was selected.

Sending one or more order entry parameters may include, for example, sending the one or more order entry parameters to the exchange system 130 via the gateway 120 or the server side device 140. Order entry parameters, which are related to each other, may be sent at the same or different times, for example, in the same message or different messages. For instance, a tradeable object parameter may be sent ahead of, or along with, a price parameter and quantity parameter that are sent to the trading strategy device or the server side device for the first time. The tradeable object parameter may be stored, for example, at the server side device. With the tradeable object parameter already at the server side device, subsequent incoming price and quantity parameters may be combined or used with the tradeable object parameter and sent collectively to the exchange system. If a change in the tradeable object parameter occurs, then an updated tradeable object parameter may be sent ahead of, or along with, price and quantity parameters following the change. In other embodiments, a price parameter, but not necessarily quantity parameter is sent to the gateway or server side device. For instance, a price parameter may be sent ahead of, along with, or after a quantity parameter.

Before explaining further, it is noted that in some embodiments, sending one or more order entry parameters may include sending a trade order. A trade order may be a message including an order (e.g., instruction or command) to buy or sell one or more tradeable objects. The trade order may define a price level for each tradeable object. Accordingly, a trade order may include one or more order entry parameters.

Furthermore, it also is noted that in some embodiments the trading device 110 prepares a trade order and sends the trade order to the exchange system 130 via the gateway 120, for example. However, in other embodiments, another device, such as the server side device 140 prepares and sends the trade order to the exchange system 130. Accordingly, the trading device 110 may send one or more order entry parameters to the server side device 140.

For instance, the trading device 110 may send order entry parameters, which are related to each other, at the same or different times to the server side device 140. Furthermore, order entry parameters may be sent in the same message or different messages. By way of example, a tradeable object parameter may be sent ahead of, or along with, a price parameter and quantity parameter that are sent to the trading strategy device or the server side device for the first time. The tradeable object parameter may be stored, for example, at the server side device. With the tradeable object parameter already at the server side device, subsequent incoming price and quantity parameters may be combined or used with the tradeable object parameter and sent collectively to the exchange system. If a change in the tradeable object parameter occurs, then an updated tradeable object parameter may be sent ahead of, or along with, price and quantity parameters following the change. In other embodiments, a price parameter, but not necessarily quantity parameter is sent to the gateway or server side device. For instance, a price parameter may be sent ahead of, along with, or after a quantity parameter.

An order entry parameter, or trade order, may be sent at the request from a user or automatically. For example, a trader may utilize the trading device 110 to place an order for a particular tradeable object. The trader may manually provide various parameters for the trade order such as an order price, quantity, or both price and quantity. As another example, a trading device 110 may automatically calculate one or more parameters for an order and automatically send the order. In some instances, a trading device 110 may prepare the order to be sent but not actually send it without confirmation from the trader.

As shown in FIG. 1, the trading device 110 includes a bus 111, a processor 112, a main memory 113, a data storage 114, a network interface 115, a display device 116, an input device 117, and an output device 118. However, in some embodiments, the trading device 110 may include additional, different, or fewer components. For example, multiple buses, multiple processors, multiple main memory devices, multiple storages, multiple network interfaces, multiple display devices, multiple input devices, multiple output devices, or any combination thereof may be provided. In another example, the trading device 110 may not include an input device 117. Instead, for example, the trading device 110 may be controlled by an external or remote input device via the network interface 115.

The bus 111 is a communication bus, channel, network, circuit, or other mechanism for communicating data between components in the trading device 110. The bus 111 may be communicatively coupled with and transfer data between any of the components of the trading device 110. For example, during an installation process of a trading application, one or more computer-readable instructions that are to be executed by the processor 112 may be transferred from the data storage 114 or the network interface 115 to the main memory 113. When the trading device 110 is running or preparing to run the trading application stored in the main memory 113, the processor 112 may retrieve the instructions from the main memory 113 via the bus 111.

The processor 112 may be a general processor, digital signal processor, application specific integrated circuit, field programmable gate array, analog circuit, digital circuit, programmed processor, combinations thereof, or other now known or later developed processing device. The processor 112 may be a single device or a combination of devices, such as associated with a network or distributed processing. Any processing strategy may be used, such as multi-processing, multi-tasking, parallel processing, remote processing, or other processing strategy. Processing may be local or remote and may be moved from one processor to another processor.

The processor 112 may be operable to execute logic encoded in one or more tangible media, such as main memory 113 or data storage 114. As used herein, logic encoded in one or more tangible media includes instructions that are executable by the processor 112 or a different processor. The logic may be stored as part of software, hardware, integrated circuits, firmware, micro-code or other now known or later developed device for storing logic. The logic may be received from an external communication device via a communication network, for example, connected to the Internet. The processor 112 may execute the logic to perform the functions, acts or tasks illustrated in the figures or described herein.

The main memory 113 and data storage 114 may be tangible media, such as computer readable storage media. Computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, any combination thereof, or any other now known or later developed tangible data storage device. The main memory 113 and data storage 114 may be a single device or, as shown in FIG. 1, different devices. The main memory 113 and data storage 114 may be adjacent to, part of, programmed with, networked with, or remote from processor 112, such that data stored in the main memory 113 and data storage 114 may be retrieved and processed by the processor 112, for example.

The main memory 113 and data storage 114 may be the same or different types of memory. For example, in one embodiment, the main memory 113 includes both random access memory (RAM) and read only memory (ROM). In this example, the RAM is a dynamic storage device that stores information and instructions to be executed by processor 112. The RAM also may be used for storing temporary variable or other intermediate information during execution of instructions to be executed by processor 112. The ROM is a static storage device for storing static information and instructions for processor 112. Furthermore, in this example, the data storage 114 may be a magnetic disk, optical disk, or flash memory for storing information to be processed by the processor 112 and instructions to be executed by the processor 112.

The main memory 113 and data storage 114 may store instructions that are executable by the processor 112. The instructions may be executed to perform one or more of the acts or functions described herein or shown in the figures. For example, the instructions are executed to perform one, some, or all of the acts shown in FIG. 2.

The network interface 115 may be a one-way or two-way communication coupling. Accordingly, the network interface 115 may communicatively connect one, two, or more communication networks or devices. For example, the bus 111 may be coupled with the communication network 102 and the communication network 104 via the network interface 115, such that one, some, or all of the components of the trading device 110 are accessible or can communicate via the communication network 102 and the communication network 104. Additionally, or alternatively, the network interface 115 may couple the bus 111 with other communication networks. The network interface 115 may be, for example, an integrated services digital network (ISDN) card or a modem to provide a data communication connection. As another example, network interface 115 may be a local area network (LAN) card to provide a data communication connection to a compatible LAN, for example, connected to the Internet. Wireless links may also be implemented. The network interface 115 may send and receive electrical, electromagnetic, or optical signals that carry analog or digital data streams representing various type of information.

The display device 116 may a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, transparent display device, or other now known or later developed display.

The trading device 110 is adapted to display a trading screen on the display device 116. Trading screens are electronic trading interfaces that activate traders to perform electronic trading acts, such as setting order entry parameters or sending the order entry parameters. Trading screens may also be used for viewing market data. Trading screens may also be used to automate these and additional actions. Trading screens may be provided by a trading application. For example, during operation, X_TRADER® may provide an electronic trading interface, one of which is referred to as MD Trader®, in which working orders and bid and ask quantities are displayed in association with a list of price levels.

A trading screen may display market information and may be interactive. An interactive trading screen may allow, for example, one or more trading actions to be performed using the trading screen. For example, an interactive trading screen may allow one or more order entry parameters to be set, sent, or set and sent using one or more order entry actions. The display device 116 or input device 117, for example, may be used to interact with the trading screen.

A trading screen may display one or more trading tools. A trading tool is an electronic tool that allows, assists with, or facilitates electronic trading. Exemplary trading tools include, for example, charts, trading ladders, market grids, order entry tools, automated trading tools, automated spreading tools, risk management tools, order parameter tools, order entry systems, market grids, fill windows, and market order windows, combinations thereof, other now known or later developed electronic tools used for trading, preparing to trade, or managing trades. As will be discussed in more detail below, each trading tool may include one or more independent elements, such as order entry cells or parameters, which may be referred to as trading tools. Accordingly, a trading tool may be made up of one or more trading tools.

Figure 2:
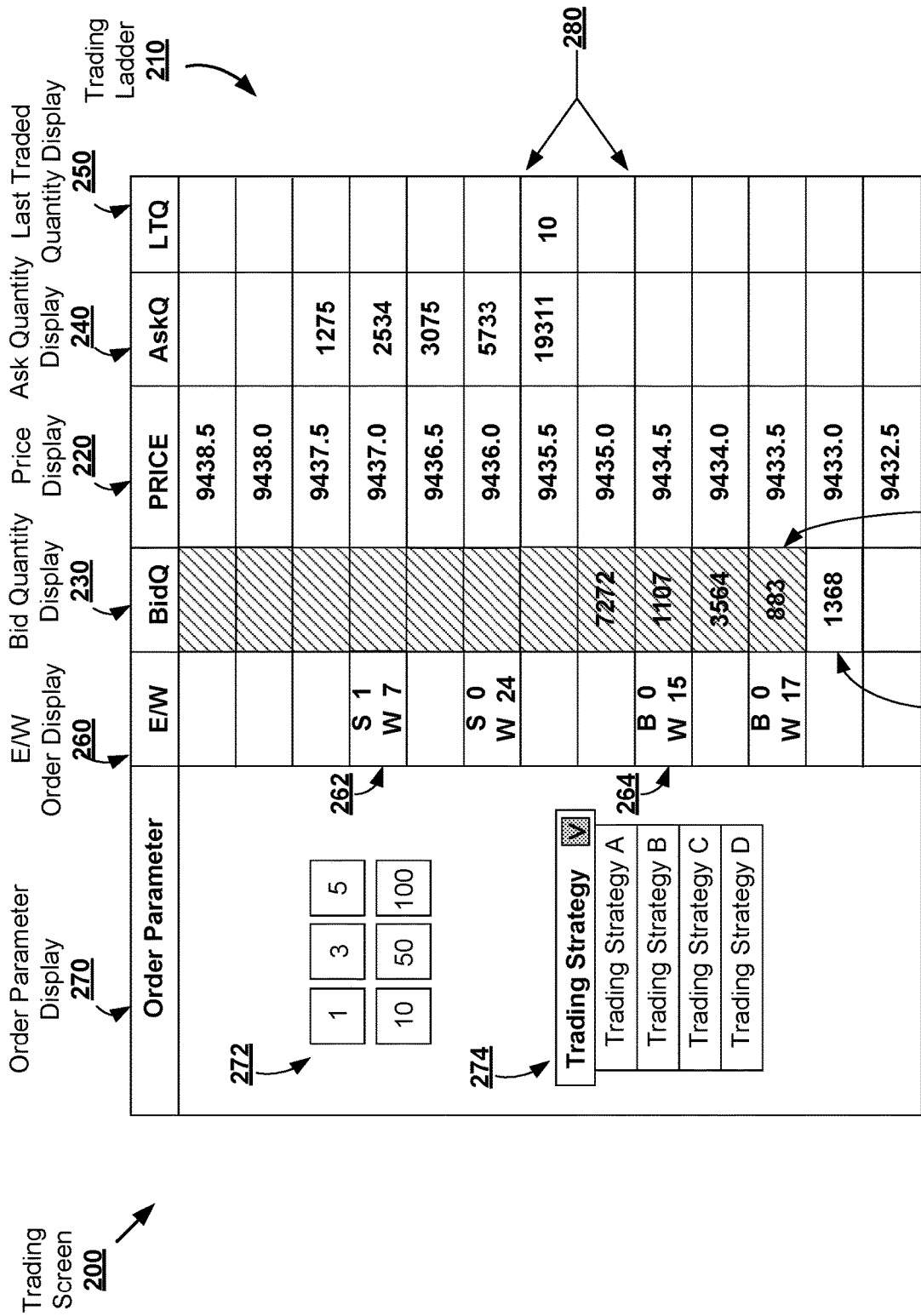
FIG. 2 illustrates an example of activating and deactivating various elements of a trading tool based on risk.

FIG. 2 illustrates an example of a trading screen 200. The trading screen 200 includes a trading ladder 210. The trading ladder 210 in its entirety can be a trading tool. Alternatively, or additionally, one or more elements (or elements) of the trading ladder 210 can be trading tools. For example, an element, such as the price display 220, the bid quantity display 230, the ask quantity display 240, the last traded quantity (LTQ) display 250, the executed/working (E/W) display 260, the order parameter display 270, the inside market display 280, or any combination thereof, may be trading tools. However, in another example, an element may also be, for example, an order entry cell or button.

The trading ladder 210 includes a price display 220, a bid quantity display 230, an ask quantity display 240, a last traded quantity (LTQ) display 250, an executed/working (E/W) display 260, an order entry parameter display 270, and an inside market display 280. The trading ladder 210 may include additional, different, or fewer displays, information, or content. Furthermore, the trading ladder 210 may be arranged as shown in FIG. 2 but does not have to be arranged as shown. For instance, FIG. 2 illustrates a price level of the price display 220 being arranged adjacent to a corresponding bid quantity of the bid quantity display 230 and ask quantity of the ask quantity display 240.

The trading ladder 210 may be used for any of order placement, order management, and market analysis. Order placement may include, for example, sending an order on to an electronic exchange. Order management may include, for example, cancelling an order, managing multiple order types, link orders as order-cancels-orders (OCOs), changing order quantity or level, displaying a position, displaying an average price, trading multiple accounts, viewing estimated position in a queue, or any combination thereof. Market analysis may include, for example, viewing depth of market (DOM), viewing implied price/volume, viewing volume at price, viewing trade level volume, viewing the inside market, viewing the last trade price and volume, setting an order size, changing a resting order, or any combination thereof.

The price display 220 may represent various prices for a tradeable object. For example, as shown, the price display 220 may be a column of prices, where the prices increment in "ticks." A tick is the minimum change in a price value that is set by the exchange for each tradeable object. The prices can be displayed as ticks, as multiples of ticks or in any other fashion. The price display 220 may list the whole prices or a portion of the whole prices (e.g., just the last two digits). Other price display conventions may alternatively be used, as long as the requisite price information is conveyed to the user. The prices in the price display 220 may be static (e.g., price levels do not normally change position unless a manual or automatic re-centering command is received), dynamic (e.g., a display that always centers on last traded price, highest bid price, or lowest ask price), some combination thereof.

The bid quantity display 230 may represent quantity of bids at a given price. The ask quantity display 240 may represent quantity of asks at a given price. The bid quantity display 230 may be a column that includes the number of bids for a price in the price display 220 and the ask quantity display 240 may be a column that includes the number offers for a price in the price display 220. For example, according to the trading ladder 210, the best bid quantity and/or best ask quantity value indicators may move up and down (for example, in the vertical direction) to reflect the change in market for the given tradeable object.

The bid quantity display 230 and ask quantity display 240 may include one or more order entry cells. An order entry cell may be an element of the display that is associated with entering a trade order. For example, the order entry cell may be selected to set one or more order entry parameters, send a trade order, or both. An order entry cell may be, for example, a key, button, menu option, charting line, or other now known or later developed element of a trading tool. An order entry cell may be selected using a cursor or pointer that is associated with an input device, such as a mouse. The cursor may be moved over an order entry cell and selected. Once selected, for example, a bid or ask parameter may be set depending on which order entry cell is selected and a trade order may be sent. In other example, an order entry cell may be associated with only setting a parameter. A selection is through a single action of a user input device (e.g., single click, double click, and so on) or through some other action (e.g., hover).

For example, as shown in FIG. 2, the bid quantity display 230 may include order entry cell 232. The order entry cell 232 shows the bid quantity for the price level "9433.5." During operation, the order entry cell 232 may be selected, for example, using a cursor or pointer. In this example, selecting the order entry cell 232 sets a price parameter to 9433.5 and an order type parameter to "Bid." The quantity parameter may be a default parameter or selected using the cursor or pointer. Selection of the order entry cell 232 may also send a trade order with the specified parameters.

The last traded quantity (LTQ) display 250 shows the last traded quantity of a tradeable object. The relative position of the quantity value with respect to the price values reflects the price at which that quantity was traded. For example, according to trading screen 200, the last traded quantity is a quantity of "10" at price "9435.5."

The executed/working (E/W) order display 260 displays the current status of the trader's orders. The status of each order is displayed in the price row where it was entered. For example, in order entry cell 262, the number next to "S" indicates the number of ordered lots that have been sold at the price in the specific row. The number next to "W" indicates the number of ordered lots that are in the market, but have not been filled. The system is working on filling the order for the lots that are in the market but have not been filled. Blanks in this column indicate that no orders are entered or working at that price. In order entry cell 264, the number next to B indicates the number of ordered lots that have been bought at the price in the specific row. The number next to "W" indicates the number of ordered lots that are in the market, but have not been filled.

The order parameter display 270 may be used, for example, to increase or decrease the quantity for a buy or sell order, the price of a buy or sell order, or a combination thereof. Other information, such as historical information, trade order information, account information, or other trade data, may be displayed or entered in the order parameter display 270. The order parameter display 270 may include one or more order entry keys 272. As shown in FIG. 2, the order entry keys 272 may be order entry buttons that are used for setting a quantity parameter. For example, an order entry button, such as the button associated with "3," may be selected to set a default quantity to three lots. The default quantity may remain three lots until a different button is selected.

The inside market 280 may be the highest quoted bid and the lowest offer (e.g., ask) price. For example, as shown in FIG. 2, the inside market 280 is 9435.0 (best bid price) and 9435.5 (best ask price). In some embodiments, the inside market 280 may move relative to the price display 220 as the best bid/ask prices change. In such an embodiment, the inside market 280 may be continuously or periodically recentered or repositioned. However, in other embodiments, the inside market 280 may remain in the same position on the screen as prices change (e.g., an always centered display).

As will be discussed below, the trading device 110 is adapted to activate or deactivate all, some, or none of a trading tool, such as the trading ladder 210. However, activating and deactivating, as discussed in more detail below, may be applied to additional, different, or fewer trading tools. For example, activating or deactivating can be applied to other trading tools, such as for example charts, market grid windows, order entry tools, automated trading tools, automated spreading tools, risk management tools, order parameter tools, order entry systems, market grids, fill windows, and market order windows. Furthermore, in some embodiments, the trading device 110 may display a trading tool without deactivating any element of the trading tool.

Returning to FIG. 1, the input device 117 may include a keyboard, mouse, microphone, touch-screen, trackball, keypad, joystick, a combination thereof, or other device for providing input, for example. The input device 117 may be used, for example, to provide command selections to processor 112. For example, the input device 117 may be a mouse that is used to control a cursor displayed on a trading screen. The mouse may include one or more buttons for selection and control, for example.

The output device 118 may include a keyboard, mouse, speakers, touch-screen, trackball, keypad, haptic device or system, joystick, a combination thereof, or other device for providing output. For example, the output device 118 may be used to output one or more signals, such as a haptic signal or an audio signal, to a user.

The gateway 120 is adapted to communicate with the trading device 110 and the exchange system 130 and may facilitate communication between the client device 110 and the server side device 140 and the exchange system 130. For example, the gateway 120 may receive one or more trade orders from the client device 110 and transmit the one or more trade orders to the exchange system 130. As another example, the gateway 120 may receive market data from the exchange 130 and transmit the market data to the trading device 110.

The gateway 120 performs processing on data communicated between the client device 110 and the exchange system 130. For example, the gateway 120 may process a trade order received from the trading device 110 into a data format acceptable by the exchange 130. Similarly, the gateway 120 may transform market data in an exchange-specific format received from the exchange 130 into a format understood by the trading device 110. The processing may include protocol translation or conversion. The processing of the gateway 120 may also include tracking orders from the trading device 110 and updating the status of the order based on fill confirmations received from the exchange system 130, for example. As another example, the gateway 120 may coalesce market data from one or more exchange systems and provide it to the trading device 110.

In general, the exchange system 130 may be owned, operated, controlled, or used by an exchange. Exemplary exchanges include the London International Financial Futures and Options Exchange ("LIFFE") and the Chicago Mercantile Exchange ("CME"). The exchange system 130 may be an electronic matching system, such as a computer, server, or other computing device, that is adapted to allow tradeable objects, for example, offered for trading by the exchange, to be bought and sold.

The exchange system 130 is adapted to match quantity of a trade order with quantity of another trade order that can result in an order fill or partial fill. A trade order may include one or more order entry parameters. For matching purposes, the exchange system 130 includes a matching engine adapted to match the trade orders. The exchange system 130 is adapted to match trade orders to buy and sell one or more tradeable objects. The tradeable objects may be listed for trading by the exchange system 130. A trade order may be received from the client device 110 or from the server side device 140. A trade order may also be received from the client device 110 through the gateway 120, for example. In addition, a trade order may be received from other devices in communication with the exchange system 130. Typically the exchange system 130 will be in communication with a variety of other client devices (which may be similar to client device 110) that also provide orders to be matched.

Furthermore, the exchange system 130 is adapted to provide market data. The market data may be provided to the client device 110, for example, through the gateway 120. Once received, the trading device 110 may process and display the market data. If displayed, the market data may be displayed on the display device 116, for example, as part of a trading screen.

As mentioned above, the trading system 100 may include a server side device 140. The server side device 140 may be a server, gateway, personal computer, remote processing device, a combination thereof, or other computing device. For example, the server side device 140 may be a trading server that is co-located at the exchange system 130. In another example, the server side device 140 may be a server running an automated trading tool, such as Autospreader® or Autotrader™, both of which are provided by Trading Technologies International, Inc. The automated trading tool may be controlled using the trading device 110, even though the server, along with the gateway 120, may be physically located at, in, around, or near the exchange system 130.

The server side device 140 may provide processing at a site that is physically located closer to the exchange system 130 than the trading device 110. Accordingly, all, some, or none of the acts or functions of the trading device 110, the gateway 120, or both the trading device 110 and gateway 120 may be performed by the server side device 140. For example, the exchange system 130 may be running a copy of X_TRADER® that is controlled by the trading device 110.

The server side device 140 may be in communication with and coupled with the gateway 120 via communication network 106. The server side device 140 may receive one or more order entry parameters. The exchange system 130 may submit a trade order to the exchange system 130, for example, via the gateway 120. The trade order may include one or more the of the order entry parameters received from the trading device 110. The server side device 140 may also be adapted for working the trade order with the exchange system 130. Working a trade order may include submitting a trade order, re-quoting a trade order, cancelling a trade order, sending a hedge order, managing a trade order, or any combination thereof.

In some embodiments, the server side device 140 may be adapted to communicate directly with the exchange system 130 and may be able to communicate with the exchange system 130 without the gateway 120. For example, in an embodiment, the server-side device, if collocated at the exchange, will not have a connection to the gateway (which is likely at the customer's premises) but to the exchange directly, or via another instance of a gateway which is also collocated at an exchange.

Before explaining further, it is noted that the trading system 100 is provided as an exemplary embodiment. The configuration and arrangement may change depending on the exact implementation. For example, the configuration and arrangement may change depending on the requirements of the electronic exchange. Furthermore, other now known or later developed components may be incorporated into the trading system 100.

II. DYNAMIC ACTIVATION AND DEACTIVATION OF ONE OR MORE ELEMENTS OF A TOOL

In an embodiment, a trading device, such as the trading device 110, is adapted to dynamically activate and deactivate one or more elements of a trading tool based on trade data. Trade data is data that relates to risk, a trading methodology, a trading strategy, a trading rule, a characteristic of a trader, movement prediction of a cursor or pointer, or any combination thereof. Trade data does not relate to availability of certain components, such as a server or gateway, of the electronic trading system 100.

As will be explained in more detail below, dynamically activating and deactivating one or more elements relates to switching the operation state from active to inactive and vice-versa. This switching may be based on, for example, risk management, a trading strategy, a trading methodology, a trading rule, a characteristic of a trader, movement prediction of a cursor or pointer, reduction of error (human or machine based), or any combination thereof. Accordingly, when determining whether one or more elements of a trading tool should be deactivated or activated, a trading device may utilize, for example, market data, one or more user inputs, a trader's characteristic, the a trader's current position, historical data, risk management parameters set by a trader or a trader's firm or other intermediaries (e.g., brokers, FCMs) involved in order execution, or other data.

Furthermore, in some embodiments, in addition to dynamically switching the operation state (e.g., active or inactive), a trading device may change the display of one or more elements of a trading tool as they change operation states. The display of these elements may be changed to indicate the current operation state of an element. For example, when an element is dynamically switched from an active state to an inactive state, the trading device may dynamically change the display of the element to indicate that the element is currently inactive, as opposed to a display that indicates that the element is active.

It is worth noting that by dynamically activating and deactivating elements on the trading screen, the trading tool effectively increases a user's confidence in placing a trade order, canceling a trade order, or both, for example, by eliminating or reducing undesirable options. Undesirable options might include those that are risky, contrary to a particular trading strategy, would result in a loss of money, and so on. Such an embodiment can improve the overall speed at which a user places or cancels a trade order by, among other things, effectively increasing the user's overall confidence in the trading tool.

A. Display of a Trading Tool with One or More Elements

As discussed above, a trading device, such as the trading device 110 of FIG. 1, may display a trading screen on a display device, such as display device 116 of FIG. 1. The trading screen may include one or more trading tools.

Each trading tool may include one or more elements. That is, a trading tool may be made up of one or more elements. An element, such as an order entry cell or button, can be used to perform one or more trade actions, such as setting and/or sending order entry parameters. For example, the trading tool shown in FIG. 2, which is the trading ladder 210, includes order entry cells, order entry buttons, and order entry drop down menus as elements. Of course, other trading tools (e.g., other trading ladders, market grid windows, charts, etc.) may include additional, fewer, or different elements. Alternatively, or additionally, in some embodiments, an element is an aspect of a trading tool that is not necessarily associated with performing a trade action.

B. Activating and Deactivating One or More Elements of the Trading Tool

The trading device may activate and/or deactivate one, some, or all of the elements of the trading tool. Activating an element includes making the element active, for example, when the element was previously inactive. Once an element is active, it may be used to perform one or more trade actions, such as setting and/or sending one or more order entry parameters. For example, when an order entry cell is active, it may be used to set and send one or more order entry parameters.

Initially (e.g., when a trading tool is booting or starting up), the trading device may active one or more of the elements. These elements may be activated after or at the same time the trading tool is displayed. For example, in some embodiments, all of the elements may default to an active state based on preconfigured settings. Accordingly, these elements may be active when the trading tool is initially displayed on the trading device. In some embodiments, a select group of elements are active and a different group of elements are inactive, for example, when the trading tool is initially started.

During operation, the trading device may activate one or more inactive elements. The activation of an inactive element may be based on, for example, risk management, a trading strategy, a trading methodology, a trading rule, a characteristic of a trader, movement prediction of a cursor or pointer, reduction of error (human or machine based), or any combination thereof. Accordingly, when determining whether one or more elements of a trading tool should be activated, a trading device may utilize, for example, market data, one or more user inputs, a trader's characteristic, the a trader's current position, historical data, risk management parameters set by a trader or a trader's firm or other intermediaries (e.g., brokers, FCMs) involved in order execution, or other data.

The decision of whether or not to activate one or more elements may be based on one or more rules that prevent undesirable conditions while allowing the trader to have freedom to trade. For example, a rule may activate all of the elements of a trading tool that do not create an undesirable situation for a trader or at least limit the possibility of the undesirable situation.

In some embodiments, one or more elements may be initially deactivated or deactivated during operation of the trading tool. Deactivating one or more elements includes making one or more elements inactive. Once an element is inactive, it cannot be used to perform a trade action. That is, deactivating an element prevents a trader from using the element to perform a trade action, even if the trader attempts to use the element to perform the trade action. Deactivating an element relates to the operation of the element, and not necessarily to the display of the element.

As will be discussed in more detail below, the deactivation of an active element may be based on, for example, risk management, a trading strategy, a trading methodology, a trading rule, a characteristic of a trader, movement prediction of a cursor or pointer, reduction of error (human or machine based), or any combination thereof. Accordingly, when determining whether one or more elements of a trading tool should be deactivated, a trading device may utilize, for example, market data, one or more user inputs, a trader's characteristic, the a trader's current position, historical data, risk management parameters set by a trader or a trader's firm or other intermediaries (e.g., brokers, FCMs) involved in order execution, or other data.

Once deactivated, an element of a trading tool may prevent one or more order entry actions associated with that element from being performed. Once an element is deactivated, an order entry action associated with the element will not be performed, even if a user attempts to use or select the deactivated element of a trading tool. However, other order entry actions, which are associated with active elements, may be performed, for example, even while one or more elements are deactivated.

C. Changing the Display of One or More Elements

In some embodiments, in addition to dynamically activating and deactivating one or more elements, the trading device may change the display of the one or more elements to indicate the current state of operation for each element. For example, the display may be changed to indicate whether the element is active or inactive.

Either prior to, at the same time as, or after activating or deactivating one or more elements of a trading tool, the trading device may change the display of the one or more elements to indicate the current operating state of the one or more elements. For example, the trading device may change the display to indicate whether an element is active or inactive. Changing the display of the trading screen may include, for example, graying out, striking out, blacking out, removing, placing an "X" across, flashing, or otherwise changing the display of the trading screen to indicate the trading tool or an element of the trading tool is deactivated. Likewise, the display may be changed to indicate that the trading tool or an element of the trading tool is activated.

In an embodiment, even when the trading screen indicates that one or more elements are inactive, information being represented by the inactive element may still be viewed by the user in real-time or near real-time. For example, an element may be inactive and the display may indicate as such, but still the value (e.g., price or quantity of bid value) being represented by the element may be visible to the user. The value being represented by the element may continue to change, even if the element remains inactive. One example of this relationship between an element being inactive, indicating that the element is inactive, and still displaying the text being represented is highlighted in an embodiment where the elements are grayed out, for example, when they are inactive.

Graying out may include changing the shade of a trading tool or an element of the trading tool such that it is evident that the element or tool is deactivated and still convey the information that is being represented by the element or trading tool (e.g., the price value being represented by the cell). For example, a white background may be changed to a darker shade. Alternatively, a black background may be changed to a lighter shade. Text shown within the trading tool or an element of the trading tool may also be changed to ensure that the text is still readable for a user. The text of a grayed out area, which may be continuously or periodically updated, may continue to be visible, even though the element is inactive. In another embodiment, blacking out may include changing the shading such that the text is not visible. For example, the display of an element of a trading tool with black text may be changed to be black. In this example, the text is not visible. In the case of colored elements, an element of the trading tool may be displayed in a lighter, darker, or different color.

Changing the display to indicate whether or not an element is active or inactive, while still showing the information being represented, improves the overall speed at which a user places or cancels a trade order by, among other things, effectively increasing the user's overall confidence in the trading tool. For example, a grayed out trading tool or element of the trading tool quickly lets the user know which actions cannot be performed and which can be performed. The grayed out component provides a signal of the current state of the user interface component, while maintaining the integrity of the data being displayed, thereby minimizing confusion for the user. Alternatively, a control element may be shown grayed out in its activated state, indicating that the user cannot deactivate it.

D. Dynamically Switching the Operation and Display of One or More Elements

In some embodiments, the trading device may dynamically switch the operation state and display of one or more elements of a trading tool to narrow down the selectable options of acceptable trade actions. The trading device may switch an element back and forth from and active state to an inactive state or vice-versa. This switching may be done in real-time or near real-time. For example, the trading tool or elements thereof are intelligently deactivated by determining that the previously selectable option should no longer be made available to the user based on one or more conditions. The deactivated tool or element thereof is preferably displayed to the user and can be intelligently activated when it is determined that the selectable option should be made available to the user. As such, elements of the trading tool may be deactivated and activated in real time and on the trading screen (e.g., right in front of the user), and in some cases, such deactivation/activation may occur without the system receiving any input from the user. Such an embodiment can improve the overall speed at which a user places or cancels a trade order by, among other things, effectively narrowing down options.

Accordingly, dynamically switching the operation state and display of a trading tool or element thereof may improve a user's confidence in the trading tool. By dynamically switching the operation state and display of a trading tool or elements thereof on the trading screen, the trading tool effectively increases a user's confidence in placing a trading order, canceling a trade order, or both, for example, by eliminating or reducing undesirable situations. Undesirable situations might include those that are risky, contrary to a particular trading strategy, would result in a loss of money, and so on. Such an embodiment can improve the overall speed at which a user places or cancels a trade order by, among other things, effectively increasing the user's overall confidence in the trading tool.

Dynamical switching may include dynamically activating and/or deactivating a trading tool or one or more elements thereof. Accordingly, this may include determining whether or not the element should be active or inactive, either continuously or periodically. In an embodiment, a trading device may determine whether or not the one or more elements of a trading tool should be deactivated or activated. This determination is based on, for example, risk management, a trading strategy, a trading methodology, a trading rule, a characteristic of a trader, movement prediction of a cursor or pointer, reduction of error (human or machine based), or any combination thereof. Accordingly, when determining whether one or more elements of a trading tool should be deactivated or activated, a trading device may utilize, for example, market data, one or more user inputs, a trader's characteristic, a trader's current position, historical data, risk management parameters set by a trader or a trader's firm or other intermediaries (e.g., brokers, FCMs) involved in order execution, or other data.

In an embodiment, the determination of whether or not an element should be active or inactive may be based on one or more rules that govern whether or not an element should be active or inactive. The one or more rules may indicate when an element of a trading tool should be grayed out. A rule may include one or more variables. A variable is a quantity or function that may assume a given value or set of values. The trading device may set a variable based on an input, default value, or other factor. Once set, the one or more variables may be used to determine whether an element should be grayed out.

For example, a rule may be: if a trader's monetary loss is greater than or equal to a first loss level, then gray out a trading tool. In another example, a rule may be: gray out any element of a trading tool that allows a trader to enter a trade order that may cause the trader's monetary loss to exceed a loss level. In yet another example, a rule may be: if a first trading strategy is being worked, then gray out a trading tool for a first tradeable object. In yet another example, a rule may be: if the delta for a tradeable object is less than 40, then gray out a trading tool for the tradeable object. In yet another example, a rule may be: gray out any element of a trading tool that allows a trader to cross the market. In yet another example, a rule may be: gray out any element of a trading tool that gives an inexperienced trader the ability to trade greater than one lot or contract at a time.

In another embodiment, the determination of whether or not an element should be active or inactive may include receiving and processing a message to activate or deactivate one or more elements of the trading tool. The message may include a command or instruction to activate or deactivate one or more elements of the trading tool. The message may even indicate which element(s) of the trading tool should be active and/or inactive. For instance, the message may indicate a specific order entry key or multiple order entry keys to deactivate. In some embodiments, the message may be sent from an external device, such as the server side device 140 of FIG. 1, to a trading device, such as the trading device 110 of FIG. 1.

Of course, there are other ways to activate and deactivate certain elements of a trading tool. For example, an exchange system may change a data feed such that when the market data is displayed, it automatically changes the display of the elements. This may include removing certain information from the data feed, such that the trading device does not have certain information.

In some embodiments, a trading device may perform intelligent switching. Intelligent switching involves switching the operation state to prevent an undesirable condition. For example, intelligent switching may be based on, for example, risk management, a trading strategy, a trading methodology, a trading rule, a characteristic of a trader, movement prediction of a cursor or pointer, reduction of error (human or machine based), or any combination thereof. Some examples of intelligent switching are discussed below.

1. Intelligent Switching Based on Risk

FIG. 2 illustrates an example of intelligent switching based on risk. In FIG. 2, a trading device deactivates and actives various elements of a trading tool, as well as change the display of the various elements, based on risk. The trading device may monitor monetary (e.g., financial) loss, for example, of a trader or a trading group for a day, week, or year. The trading device may ensure that the monetary loss does not exceed a loss level, for example, by deactivating and changing the display of one or more order entry cells 232 of the trading ladder 210. The loss level may be set by a trader, manager, or other person responsible for managing risk.

The trading device deactivates and changes the display of order entry cells 232 for bids at prices that place a user at risk of exceeding (or equaling) the defined loss level. In FIG. 2, these price levels are at least "9435.0" to "9433.5." Order entry cells 232 are deactivated. Once inactive, even if a user attempts to select one of the deactivated order entry cells 232, for example, using a cursor or pointer, the order entry action associated with the order entry cell will not be performed, for example, by the trading device. The cells above the highest bid may also be deactivated, thereby preventing a user from placing an order at the market, for example.

The display of these cells may also be changed to indicate that the cells are inactive. The inactive cells 232 are illustrated with slanted lines in FIG. 2. Since the order entry cells 234 do not place the user at risk of exceeding (or equaling) a loss level, the order entry cells 234 may remain active. Accordingly, in the event that the user selects one of the order entry cells 234, such as the order entry cell associated with the price level of "9433.0," the trading device may perform the order entry action associated with that order entry cell. For example, the trading device may send a trade order priced at "9433.0."

It should be noted that the trading device may continuously or periodically activate and deactivate one or more of the elements of the trading tool. For example, the trading device may activate or deactivate the same or different order entry cells as market data changes or as a trader's overall position changes. As such, it is possible for elements to be activated or deactivated in response to a user input, a change in received data, or both. Elements may be activated or deactivated in real time (or near real time) and right in view of the user. Accordingly, it is possible for an element of a trading tool to dynamically switch back and forth between active and inactive, for example, as the trading device receives user input, market updates, or other information that may be used to prevent undesirable conditions.

As an example of the switching back to a previous operating state, a trading device may determine that based on current market conditions and the established risk limits, placing a bid at the price level of "9433.0" may put the trader in an undesirable position and thus deactivates or inactivates the cell 234 that is currently active. The trading device may also change the display of this cell to reflect that the cell was deactivated. Accordingly, the display of this cell may be changed to be same or similar as the other inactive cells 232. Therefore, the first active cell 234 that is available for placing a bid is now at the price level of "9432.5." However, as one or more conditions change, the trading device may determine that placing a bid at the price level of "9433.0" no longer puts the trader in an undesirable position. Accordingly, the trading device may change the order entry cell back to active and also change the display to illustrate that the cell is active. Accordingly, the first active cell 234 that is available for placing a bid is now at the price level of "9432.5."

Figure 3:
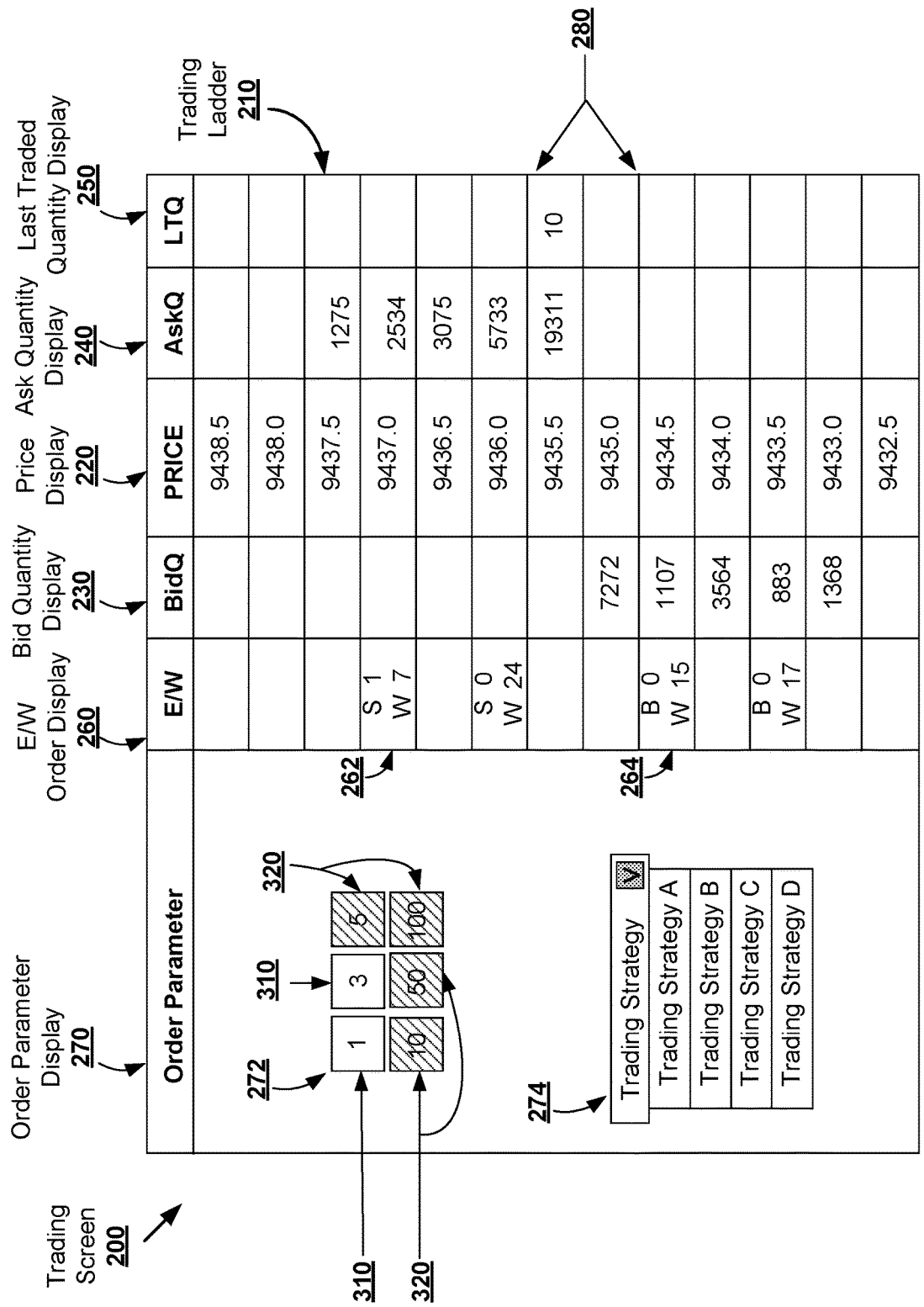
FIG. 3 illustrates another example of activating and deactivating various elements of a trading tool based on risk.

FIG. 3 illustrates another example of deactivating and changing the display of order entry cells based on risk. In FIG. 3, a trading device may deactivate certain quantities that would cause the trader to exceed a risk level. For example, a trader may not have enough margin to place a trade with a quantity of "5," "10," "50," and "100." Accordingly, the trading device 110 may leave the order entry buttons 310 that would not cause the trader to exceed a risk level active and deactivate and change the display of the order entry buttons 320 associated with the values that would cause the trader to exceed the risk level.

2. Intelligent Switching Based on a Trading Methodology

Figure 4:
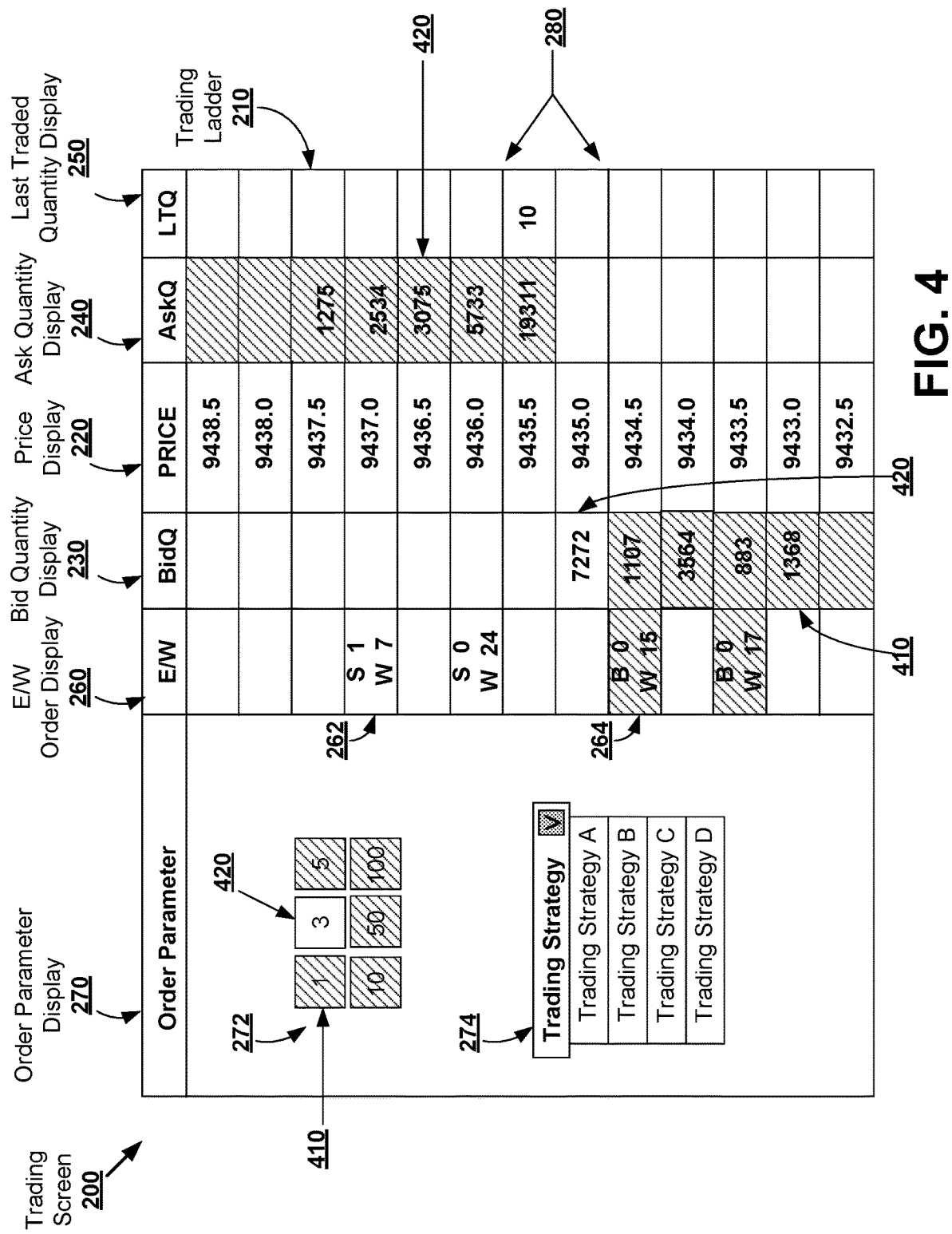
FIG. 4 illustrates an example of activating and deactivating various elements of a trading tool based on a trading methodology.

FIG. 4 illustrates an example of deactivating and changing the display of order entry cells based on a trading methodology. A trading methodology may be a set of rules that assist with trading. For example, a trading methodology may be a methodology to capitalize on changes in a market, spread trade, auto-trade, limit risk, flatten a trader's portfolio, or perform other trading related acts or methods. A trading methodology may be manually set by a trader or automatically set (e.g., without or with very little assistance from a trader). The trading device may analyze one or more trading methodologies to determine which order entry cells to gray out.

In an embodiment, a trading tool may be deactivated in accordance with a trading methodology that flattens out a trader's portfolio. Flattening a portfolio relates to ensuring that a trader's overall position is not long or short. For example, flattening a portfolio relates to ensuring that a trader has not bought more contracts than they have sold or vice-versa. A trading device may analyze the trading methodology, which may be comprised of one or more trading rules designed to flatten out the trader's portfolio, to determine which elements of the trading tool to deactivate and which elements to activate or leave activated. Analyzing the trading methodology may include analyzing a trader's overall position. For example, a trader's overall position may be short three contracts. That is, the trader may have sold three more contracts than were bought. Accordingly, the trading device, in accordance with the trading methodology, may begin assisting the trader with flattening the portfolio. The trading device may provide assistance by illustrating which trades to make. As shown in FIG. 4, the trading device deactivates certain order entry cells that assists with flattening a portfolio, such as order entry cells 410, 420. The display of these cells 410, 420 may be changed to reflect that the cells are inactive. The order entry cells 410, 420 that are deactivated are illustrated by slanted lines.

Of course, a trading tool may be deactivated in accordance with one or more other trading methodologies. For example, in an embodiment, a trading tool may be deactivated to assist with or facilitate spread trading. In this example, one or more elements of a first trading tool, which is used to trade or monitor a first tradeable object, may be deactivated or activated in accordance with a spread trading methodology when one or more elements of a second trading tool, which are used to trade or monitor a second tradeable object, are selected or used. Spread trading attempts to capitalize on relationships between tradeable objects, such as the first and second tradeable objects. For example, if a trader buys a first tradeable object, then the ability of buying the second tradeable object may be removed by deactivating and changing the display of all or some of the bid column of the second trading tool.

3. Intelligent Switching of an Entire Trading Tool

Figure 5:
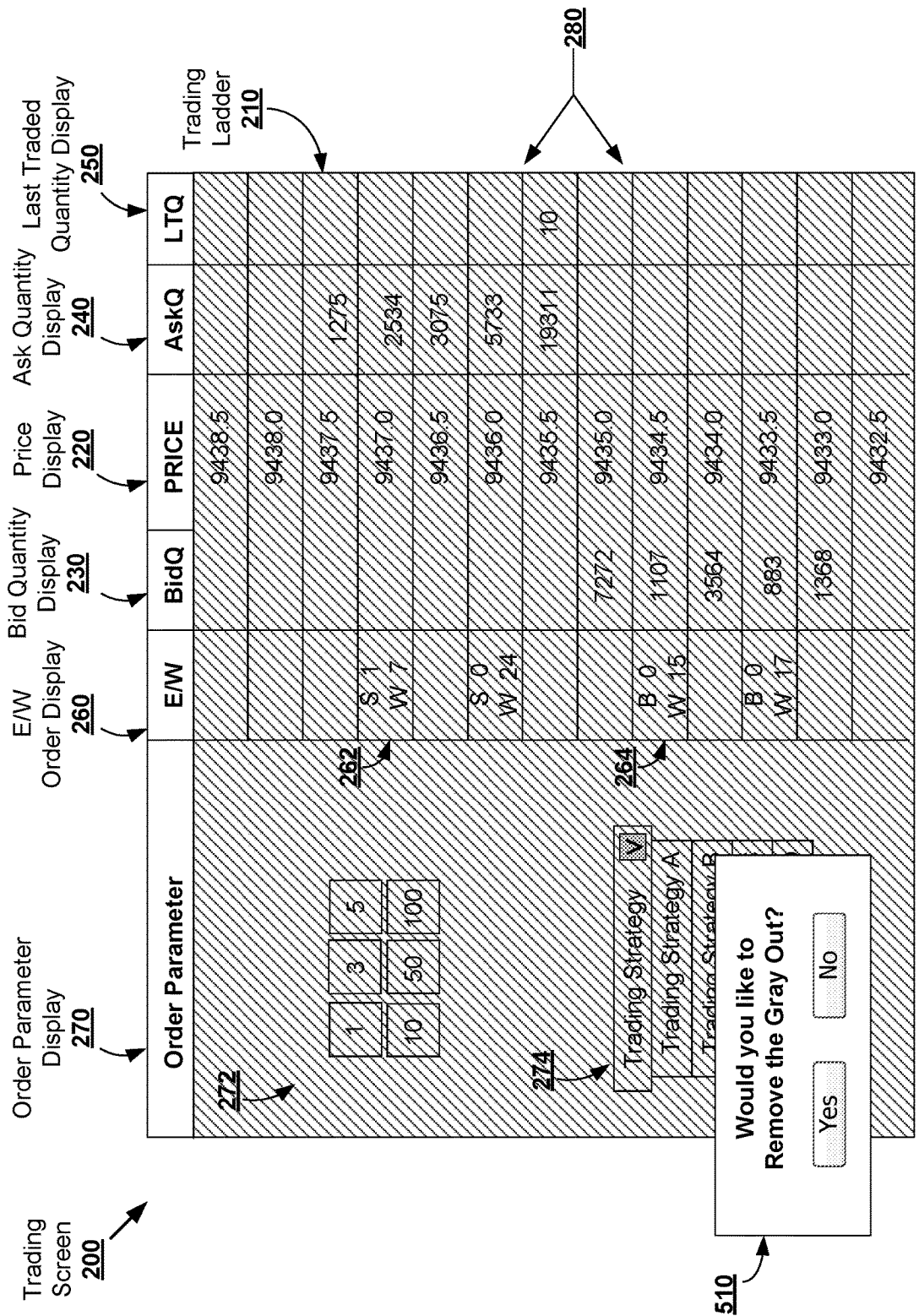
FIG. 5 illustrates an example of deactivating an entire trading tool.

FIG. 5 illustrates an example of deactivating and changing the display of an entire trading tool. Instead of deactivating and changing the display of only a single element of a trading tool or even various elements of a trading tool, the entire trading tool may be deactivated, for example. In an embodiment, a trading tool may be grayed out during certain time periods. For example, a trading tool may be deactivated when a market for a specific tradeable object is not available (e.g., when the markets are closed) or when the market is too risky to trade (e.g., excessive market movement) or when a trader is not at the trading device (e.g., in a meeting).

In an embodiment, a portion of a trading tool or a trading tool may be deactivated when a trader is not using the trading tool. For example, a trading tool may be grayed out when a trader switches applications, leaves the trading device, or otherwise stops paying attention to the trading tool.

In an embodiment, as shown in FIG. 5, a trader may override or remove the deactivated portion(s) of the trading tool or tool. For example, in the event that a trading tool is deactivated and a trader attempts to use the trading tool, the trading device may provide a pop up window 510 that provides the trader with the choice of activating the deactivated portion(s) of the trading tool or trading tool. The deactivated portions may be password protected, for example, to protect a third party from activating and using the portions of the trading tool or protect an inexperienced trader from removing the deactivating feature (e.g., a manager may have the password but the inexperienced trader does not).

In an embodiment, a trader may provide an input, such as a command, that deactivates some or all of a trading tool. In an example, a trader may provide this input whenever leaving the trading device, so as to prevent someone else from using the trading tool. In this example, the entire trading tool may be deactivated. The display of the trading tool may indicate that it is deactivated, even though someone may still view the market data being displayed on the trading tool. Accordingly, upon returning to the trading device, the trader may view live market data, even when the trading tool is deactivated. When ready, the trader may activate the trading tool again, so that the trading tool is able to be used to set or send trade order parameters.

4. Intelligent Switching to Protect From a Moving Market

In another embodiment, each cell may be deactivated except the cell that the cursor is over before an update to the screen occurs. For example, when a cursor is placed over a cell associated with a price of 100 ("the 100 cell") in a dynamic screen, the screen updates and now the cursor is placed over a cell associated with a price of 102 ("the 102 cell"), the 102 cell would be dynamically deactivated and if the user clicks just after the update, then user is protected from entering an order at 102 (which was intended to be at a price of 100). The cell of 100 is not dynamically deactivated, but of course, has moved to a different location.

III. EXAMPLE METHOD FOR DYNAMICALLY ACTIVATING AND DEACTIVATING A TRADING TOOL

Figure 6:
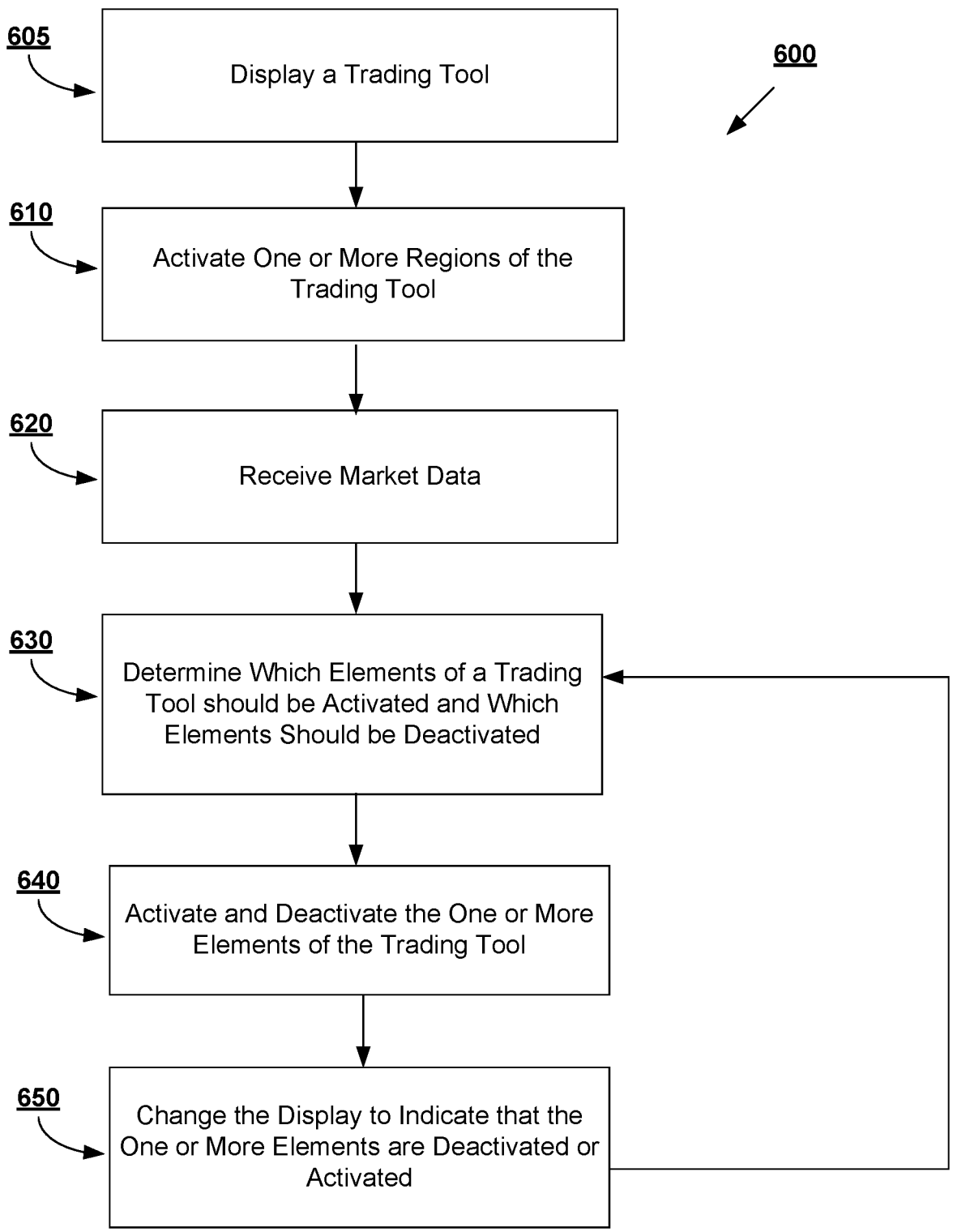
FIG. 6 illustrates an example of a method for graying out a trading tool.

FIG. 6 illustrates an example of a method 600 for activating and deactivating a trading tool or an element of the trading tool. The method 600 includes displaying a trading tool 605, activating one or more elements of a trading tool 610, receiving market data 620, determining whether a trading tool or an element of the trading tool should be deactivated 630, deactivating a trading tool or an element of the trading tool 640, and changing the display to indicate that the one or more elements of the trading tool are deactivated 650. The method 600 may also include determining whether one or more elements of the trading tool should be activated 660.

Before explaining further, it is noted that the acts shown in FIG. 6 may be performed in the order shown or a different order. For example, act 620 may be performed prior to or at the same time as act 610. Furthermore, the method 600 may include additional, different, or fewer acts. Various combinations of the acts shown in FIG. 6, or even individual acts, may be performed as independent embodiments of the method 600.

The method 600 is implemented using the system 100 of FIG. 1 or a different system. For example, the trading device 110 of FIG. 1 may perform one, some, or all of the acts. In some embodiments, the components described below, such as the trading device, gateway, exchange system, and server side device, are the same or similar to components of FIG. 1. However, in other embodiments, devices or systems not shown in FIG. 1 may be used to perform the method 600.

In act 605, a trading device displays a trading tool on a display device, such that a trader is able to at least view the trading tool. The trading tool may include one or more elements that may be used to perform one or more trade actions. The trading tool may be displayed on a trading screen, which may include zero, one, or more other trading tools.

In act 610, the trading device may activate the trading tool or one or more elements thereof. Activating one or more elements includes making one or more of the elements active. Once an element is active, it may be used to perform one or more trade actions. Initially (e.g., when the trading tool is being booted or starting up), the trading device may activate zero, one, some, or all of the elements in the trading tool. A trader may use the activated elements to perform one or more trade actions. However, during operation, the trading device may change one or more inactive elements to active elements.

In act 620, the trading device receives market data from an exchange system. Market data can be transmitted from the exchange system via a gateway, a server side device, both a gateway and a server side device, or other now known or later developed device(s) for facilitating communication between the trading device and the exchange system.

Market data may be periodically transmitted from the exchange system. For example, the exchange system may transmit market data at certain time intervals, as market data changes, upon receiving a request for market data, or any combination thereof. Accordingly, receiving market data from the exchange system may include periodically receiving market data from the exchange system. The market data may be processed by the trading device.

In act 630, the trading device may determine which elements should be activated and which elements should be deactivated. Determining whether one or more active elements of a trading tool should be active or inactive may be based on trade data. Trade data is data that relates to risk, a trading methodology, a trading strategy, a trading rule, a characteristic of a trader, movement prediction of a cursor or pointer, or any combination thereof. Trade data does not relate to availability of certain components, such as a server or gateway, of an electronic trading system.

A trading tool or an element of a trading tool may be deactivated to prevent a user from using or selecting the trading tool or an element of the trading tool. For instance, a trading tool or an element of the trading tool may be deactivated to limit the user's risk, to prevent a user from selecting a parameter outside of a trading methodology, to prevent a user from trading a tradeable object that is adverse to a trading strategy, or to prevent a user from crossing the market.

It is noted that there are numerous methods for determining whether a trading tool or an element of a trading tool should be deactivated. Only a few of the many different methods are explained below. The methods may be used independently or in combination with each other.

In an embodiment, determining whether a trading tool or an element of a trading tool should be activated or deactivated includes receiving and processing a message to activate or deactivate a trading tool or an element of the trading tool. The message may include a command or instruction to activate or deactivate a trading tool or an element of the trading tool. The message may even indicate which trading tool or element of the trading tool should be deactivated. For instance, the message may indicate a specific order entry key or multiple order entry keys to activate or deactivate.

The deactivation or activation message may be received from, for example, a server side device, exchange system, gateway, or other now known or later developed device. For instance, in an embodiment, a management device may receive market data and monitor various factors to determine whether to gray out a trading tool or an element of the trading tool. The management device may be located at a different physical location than the trading device. During operation, the management device may transmit a message to the trading device to activate or deactivate a trading tool or an element of the trading tool. Based on the message, the trading device may determine whether to deactivate a trading tool or an element of the trading tool.

In another embodiment, determining whether a trading tool or an element of a trading tool should be activated or deactivated includes using one or more rules to determine whether a trading tool or an element of a trading tool should be active or inactive. The one or more rules may indicate when a trading tool or an element of a trading tool should be activated or deactivated. A rule may include one or more variables. A variable is a quantity or function that may assume a given value or set of values. The trading device may set a variable based on an input, default value, or other factor. Once set, the one or more variables may be used to determine whether a trading tool or an element of a trading tool should be grayed out.

For example, a rule may be: if a trader's monetary loss is greater than or equal to a first loss level, then deactivate a trading tool or one or more elements thereof.

In another example, a rule may be: deactivate any element of a trading tool that allows a trader to enter a trade order that may cause the trader's monetary loss to exceed a loss level.

In yet another example, a rule may be: activate any element of a trading tool that does not cause the trader's monetary loss to exceed a loss level.

In yet another example, a rule may be: if a first trading strategy is being worked, then deactivate a trading tool for a first tradeable object.

In yet another example, a rule may be: if the delta for a tradeable object is less than 40, then deactivate a trading tool or an element thereof for the tradeable object.

In yet another example, a rule may be: deactivate any element of a trading tool that allows a trader to cross the market.

In yet another example, a rule may be: deactivate any element of a trading tool that gives an inexperienced trader the ability to trade greater than one lot or contract at a time.

In response to analyzing one or more rules, the trading device may determine that a trading tool or an element of a trading tool should be active or inactive. Analyzing one or more rules may include processing a rule using one or more inputs. An input may be a variable received from the exchange system, server side device, a database, external device, or other system. For example, a trader's monetary loss may be stored in a first database that may be queried by the trading device. The first loss level may be stored in a second database that may be queried by the trading device. The first and second databases may be the same or different databases and may be stored on the trading device or a different device. The trading device may periodically query the first and second databases and determine whether to gray out a trading tool or an element of a trading tool using the trader's monetary loss and first loss level. For example, a trading tool may be grayed out if a trader's monetary loss is greater than or equal to a first loss level.

In act 640, the trading device activates or deactivates the one or more elements of the trading tool, for example, depending on whether the elements should be active or inactive. For example, in the event that the trading device determines that an inactive element should be activated, as determined in act 630, the trading device may activate the element. However, in the event that the trading device determines that a trading tool or an element of a trading tool should be deactivated, as determined in act 630, then the trading device may deactivate the trading tool or elements thereof that should be deactivated. However, in the event that the trading device determines that a trading tool or an element of a trading tool should be active, the method may activate the inactive element.

The trading device may determine whether a trading tool or an element of a trading tool should be activated. In the event that a trading tool, which has been deactivated in some form, should be activated, the trading device may activate the trading tool or an element thereof. Activating an element of a trading tool, or even an entire trading tool, may include changing the operation state of the element to active, such that a trader can begin using the element (or trading tool) to begin performing trade actions.

Deactivating one or more elements includes making one or more elements inactive. Once an element is inactive, it cannot be used to perform a trade action. Deactivating a trading tool may include deactivating one or more elements of the trading tool. For example, in some embodiments, the entire trading tool or elements thereof may be deactivated.

Deactivating may include inactivating the trading tool or an element of the trading tool. For example, deactivating may include switching an operating state of a trading tool or an element of the trading tool from an active state to an inactive state. When in an active state, the trading tool or an element of the trading tool may be selected to perform a trade action. However, when in an inactive state, the trading tool or an element of the trading tool cannot be used to perform the trade action. In some instances, a user may attempt to select an inactive trading tool or an inactive element of the trading tool but the selection will not result in the trade action being performed. For example, if the cell in a trading ladder is deactivated, selection of the order entry cell will not set a parameter or send a trade order. The order entry cell is considered to be inactive.

Before explaining further, it should be noted that deactivating an element of the trading tool may include deactivating multiple elements of the trading tool. The various elements may be related or unrelated. Furthermore, the various elements of the trading tool that are deactivated may be located adjacent to or remote from each other.

In act 650, the trading device changes the display of the trading screen to indicate that the trading tool or elements thereof were active or deactivated. Changing the display of the trading screen may include, for example, graying out, striking out, placing an "X" across, flashing, or otherwise changing the display of the trading screen to indicate the trading tool or an element thereof are active or inactive. This may be performed at the same time as or shortly after act 640.

Graying out may include changing the shade of a trading tool or an element of the trading tool. For example, a white background may be changed to a darker shade or a black background may be changed to a lighter shade. Text shown within the trading tool or an element of the trading tool may also be changed to ensure that the text is still readable for a user. For example, the text of a grayed out area may be changed to ensure that the text is visible. In another embodiment, graying out may include changing the shading such that the text is not visible. For example, the display of an element of a trading tool with black text may be changed to be black. In this example, the text is not visible.

In some embodiments, graying out a trading tool component includes display the trading tool component with a light shade of gray instead of white or black to indicate that it cannot currently be operated or selected by the user. However, in the case of colored elements, the trading tool component may be displayed in a lighter, darker, or different color. A grayed out component quickly lets the user know which actions cannot be performed. Graying out a user interface component deactivates a control associated with the user interface component, such that the control cannot be used. The grayed out component provides a signal of the current state of the user interface component, while maintaining the user interface component in a consistent location, thereby minimizing confusion for the user. Alternatively, a control element may be shown grayed out in its activated state, indicating that the user cannot deactivate it.

Changing the display of an element of the trading tool may include changing the display of multiple elements of the trading tool. The various elements may be related or unrelated. Furthermore, the various elements may be located next to or away from each other. Once the trading screen is changed to indicate that a trading tool or an element of a trading tool is deactivated (e.g., has been grayed out), the trading device may begin determining whether the elements that were just activated or deactivated or even other elements should be activated or deactivated. This may be done by looping back around to act 620 or even 630, for example.

IV. CONCLUSION

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A non-transitory computer readable medium having stored therein instructions executable by a processor, including instructions executable to:
    display a trading screen including a trading ladder, wherein the trading ladder includes a plurality of order entry cells, wherein each order entry cell of the plurality of order entry cells is associated with a price for a tradeable object;
    determine whether each order entry cell of the plurality of order entry cells should be active or inactive based on risk management data and market data received from an electronic exchange, wherein each order entry cell of the plurality of order entry cells, when active, is operable to perform the at least one trade action and, when inactive, is inoperable to perform the at least one trade action;

dynamically activate an order entry cell of the plurality of order entry cells in response to determining that the order entry cell should be active;

dynamically deactivate an order entry cell of the plurality of order entry cells in response to determining that the order entry cell should be inactive; and change the display of each order entry cell of the plurality of order entry cells to indicate whether the order entry cell is active or inactive.

2. The non-transitory computer readable medium of claim 1, wherein the plurality of order entry cells are aligned with a price display of the trading ladder.

3. The non-transitory computer readable medium of claim 1, wherein the trading ladder includes a bid quantity display and an ask quantity display.

4. The non-transitory computer readable medium of claim 3, wherein the bid quantity display includes a plurality of bid quantity cells, wherein the ask quantity display includes a plurality of ask quantity cells.

5. The non-transitory computer readable medium of claim 4, wherein the plurality of order entry cells includes the plurality of bid quantity cells and the plurality of ask quantity cells.

6. The non-transitory computer readable medium of claim 1, wherein the risk management data defines a risk limit.

7. The non-transitory computer readable medium of claim 6, wherein an order entry cell of the plurality of order entry cells is determined to be active when performing the at least one trade action associated with the order entry cell does not exceed the risk limit.

8. The non-transitory computer readable medium of claim 6, wherein an order entry cell of the plurality of order entry cells is determined to be inactive when performing the at least one trade action associated with the order entry cell exceeds the risk limit.

9. The non-transitory computer readable medium of claim 1, wherein the at least one trade action includes setting an order entry parameter.

10. The non-transitory computer readable medium of claim 9, wherein the at least one trade action includes sending an order.

11. The non-transitory computer readable medium of claim 1, wherein the instructions to dynamically activate the order entry cell include instructions executable to switch an operation state of the order entry cell from inactive to active.

12. The non-transitory computer readable medium of claim 1, wherein the instructions to dynamically deactivate the order entry cell include instructions executable to switch an operation state of the order entry cell from active to inactive.

13. The non-transitory computer readable medium of claim 1, wherein the instructions to change the display of an order entry cell of the plurality of order entry cells include instructions executable to gray out the order entry cell to indicate when the order entry cell is inactive.

14. The non-transitory computer readable medium of claim 1, wherein the instructions to change the display of an order entry cell of the plurality of order entry cells include instructions executable to shade the order entry cell to indicate when the order entry cell is inactive.

* * * * *